Jan. 8, 1924.

J. H. STEBBINS 1,480,311

QUICK REMOVAL COVER

Filed March 12, 1923

Inventor
J. H. Stebbins

By G. C. Kennedy

Attorney

Patented Jan. 8, 1924.

1,480,311

UNITED STATES PATENT OFFICE.

JAMES H. STEBBINS, OF WATERLOO, IOWA, ASSIGNOR TO GEORGE H. QUEST AND SIDNEY C. SMITH.

QUICK-REMOVAL COVER.

Application filed March 12, 1923. Serial No. 624,581.

*To all whom it may concern:*

Be it known that I, JAMES H. STEBBINS, a citizen of the United States of America, and a resident of Waterloo, Blackhawk County, Iowa, have invented certain new and useful Improvements in Quick-Removal Covers, of which the following is a specification.

My invention relates to improvements in quick-removal covers, and the object of my improvement is to supply for use on clean-out traps, receptacles, conduits and other like structures, a cover closure therefor and a special locking member, both having engaging-means, the one for separable engagement with said member, and said member for separable engagement with mating engaging-means on the trap or other structure, whereby both are easily interlocked with said structure and as easily disengaged therefrom.

Figure 1:
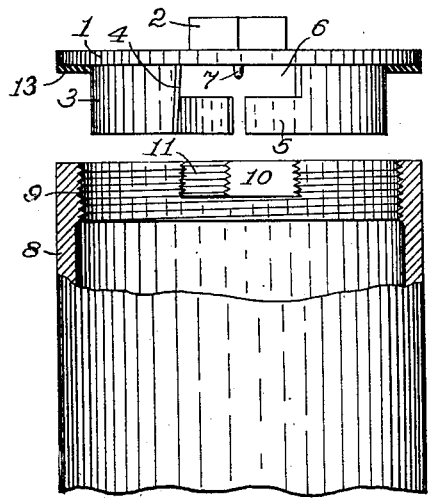
Figure 2:
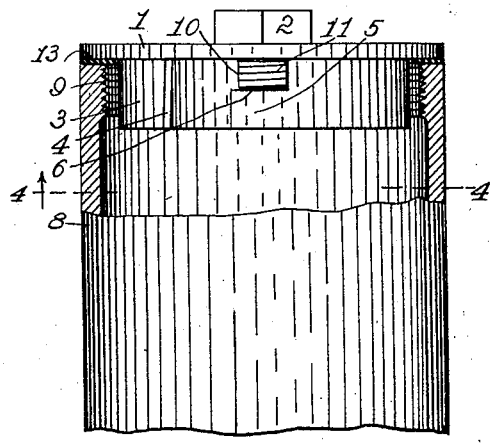
Figure 3:
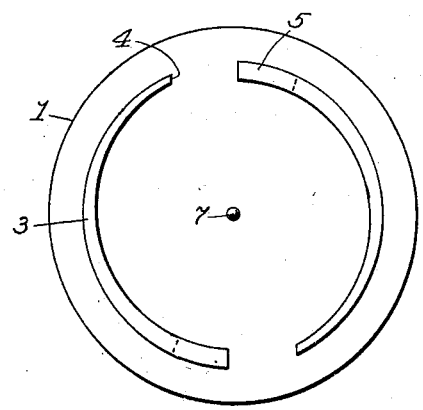
Figure 4:
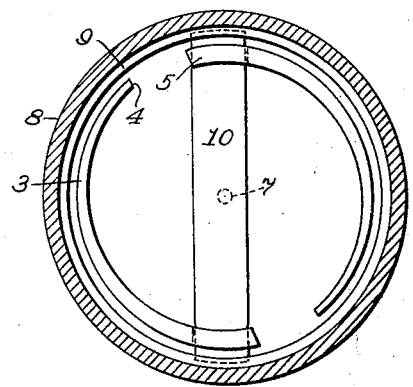
Figure 5:
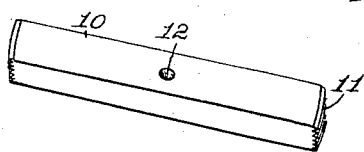

This object I have accomplished by the means which are hereinafter described and claimed, and which are illustrated in the accompanying drawings, in which Fig. 1 is an elevation of said cover, said auxiliary member and the upper part of a clean-out trap, the top of the trap being in central vertical section, and the cover separated from the trap, the auxiliary member being in endwise mesh with interior threads of the trap. Fig. 2 is a similar view of said structures, showing the cover secured to the trap by locking engagement with said auxiliary member. Fig. 3 is an under plan view of said cover. Fig. 4 is a horizontal section of said trap, looking upwardly, taken on the broken line 4—4 of said Fig. 2. Fig. 5 is a perspective view of said auxiliary member.

Closure covers for clean-out traps and other receptacles or containers for fluids have different means for removably locking them in place to effect tight joints. Where such covers have a threaded connection in each case with the traps, the relatively extensive area of contact between the threads permits of rust, corrosion, or adhesive fillings in the joint practically making the joint inseparable without breakage of the parts, or cutting away of the cover. The same defect occurs when the cover has a screw connection to the trap interiorly of the latter where subject to corrosion by the vapors or fluid contacts of the contents of the trap or other container, and in order to open the trap to clean it out, special tools have to be forcibly employed, and a skilled workman summoned, usually injuring the parts.

By the employment of my improvements, these difficulties and losses are wholly obviated, and the operation of removing the closure cover of a trap, or the replacing of it thereon, rendered simple and easy.

The numeral 8 denotes the open upper end of a clean-out trap or other fluid container interiorly threaded for a limited distance downwardly at 9. The numeral 10 denotes said auxiliary member, being preferably in the shape of a cross-bar of rectangular section and having its opposite ends shaped with fractional threads whereby its said threads 11 may be intermeshed with the interior threads 9 of the trap 8. The upper face of said cross-bar has a shallow pit or socket-bearing 12 for a purpose to be described.

The closure cover 1 may be of discoidal or other shape, imperforate and having a squared central stud on its upper surface at 2 for engagement by a wrench in the turning of the cover to and fro in the placing or removal of the cover.

Depending from the under surface of said cover are a pair of segmental arcuate projections 3, separated at opposite ends by a relatively wide opening or split 4, and one end of each projection being cut away at 6 to provide a tongue 5, whereby a joint of the bayonet-joint type is provided at each of opposite ends of the projections 3. The projections have their inner walls formed eccentrically, in order to gradually thicken them toward and including the tongues 5 to strengthen and support them at said joints. A small conical pin or pivotal projection 7 extends downwardly integrally from the center of the under face of the cover 1.

The cross-bar is first placed in mesh with the threads 9 of the open top of the trap 8, positioning the bar diametrally across the trap. The cover is secured by inserting the arcuate projections into the trap allowing the bar 10 to enter the openings 4, and the cover is then turned to carry the tongues 5 under the bar interlocking them therewith in the bayonet-joints 6. To remove the cover, it is turned in the opposite direction, which releases the tongues 5 from the bar 10. The bar 10 may then be either removed from the trap, or permitted to remain in mesh, when the contents of the trap are cleaned out, as there is sufficient clearance space on each side of the bar.

As the areas of contacts in the meshed joints of the bar ends and the threads 9 are small, any adhesions or corrosions are easily broken when the bar is turned either way around.

The bar 10 may be made of brass or non-corrodible material, so that there is a minimum of corrosion possible. A rubber washer 13 may be mounted around the arcuate projections 3 in contact with the under surface of the cover 1 to be compressed between the cover and the upper edge of the trap 8 to seal the joint therebetween.

Having described my invention, what I claim as new, and desire to secure by Letters Patent, is:

1. In combination, a container having an interiorly-threaded open end, a cross-bar having its opposite ends threaded with the threads in mesh with the container threads, and a cover having projections depending into the container on opposite sides of said cross-bar, the projections each having a lateral opening to receive and interlock with the cross-bar releasably.

2. In combination, a container having an interiorly-threaded open end, a cross-bar having its opposite ends threaded with the threads in mesh with the container threads, and a cover having arcuate projections depending into the container on opposite sides of said cross-bar, the projections each having an end opening to releasably receive and interlock with the cross-bar when the cover is turned, and each projection increasing in thickness toward and including its end having said opening.

3. In combination, a container having an interiorly-threaded open end, a cross-bar positioned diametrally across the open end of said container and having its opposite ends threaded with the threads in mesh with said container threads, said cross-bar having a central bearing-socket, and a cover having a central pivot-stud for insertion into said bearing-socket, and having a like pair of arcuate segmental projections on its face adjacent the container, said projections being spaced apart at their ends to depend on opposite sides of the cross-bar, an end of each projection being cut away laterally to provide bayonet-joints at opposite sides of the cover to releasably receive and interlock with the ends of said cross-bar when the cover is partially rotated appropriately on its said pivotal connection to the cross-bar.

4. In combination, an open end hollow body, an imperforate cover therefor having a lateral recess, and a bar having its ends releasably and adjustably secured within said hollow body and interlockingly and separably received in the recess of said cover.

Signed at Waterloo, Iowa, this 19th day of February, 1923.

JAMES H. STEBBINS.